United States Patent [19]

Falbe et al.

[11] 4,370,458

[45] Jan. 25, 1983

[54] PROCESS FOR THE MANUFACTURE OF POLYOLEFINS

[75] Inventors: Jürgen Falbe, Dinslaken; Peter Schneller, Oberhausen; Wolfgang Payer, Wesel; Ingrid Förster, Mulheim; Boy Cornils, Dinslaken; Hans-Walter Birnkraut, Oberhausen; Siegfried Lutze, Gelsenkirchen; Karl Otterbein, Oberhausen, all of Fed. Rep. of Germany

[73] Assignee: Ruhrchemie AG, Oberhausen, Fed. Rep. of Germany

[21] Appl. No.: 954,021

[22] Filed: Oct. 23, 1978

Related U.S. Application Data

[63] Continuation of Ser. No. 785,275, Apr. 6, 1977, abandoned.

[30] Foreign Application Priority Data

Jul. 6, 1976 [DE] Fed. Rep. of Germany ....... 2630262

[51] Int. Cl.$^3$ ............................ C08F 4/64; C08F 10/02
[52] U.S. Cl. .................................. 526/138; 526/348.5; 526/348.6; 526/352; 526/905
[58] Field of Search .................................. 526/138, 905

[56] References Cited

U.S. PATENT DOCUMENTS 3,007,908 11/1961 Craf et al. ......................... 526/138

3,051,690 8/1962 Vandenberg ........................ 526/905

FOREIGN PATENT DOCUMENTS 806904 1/1959 United Kingdom ................ 526/138
1233599 5/1971 United Kingdom ................ 526/905

*Primary Examiner*—Edward J. Smith
*Attorney, Agent, or Firm*—Sprung, Horn, Kramer & Woods

[57] ABSTRACT

An improvement in a process for the preparation of an ethylene homopolymer or a copolymer of ethylene with an α-olefin containing 3 to 15 carbon atoms by contacting the monomer or mixture of monomers in solution, suspension or in gas phase at 20° to 250° C. at a pressure of 1 to 50 bar with a mixed catalyst comprising a chlorine containing titanium (III) compound and an organoaluminum compound in the presence of hydrogen, the improvement residing in employing as the organoaluminum compound a trialkylaluminum compound in an amount of 0.1 to 20 mol per mol titanium (III) compound and including in the polymerization mixture oxygen at a concentration of 0.001 to 0.1 volume percent based upon the amount of ethylene. By carrying out the polymerization by including oxygen in the polymerization reaction mixture and employing trialkylaluminum compound as the organoaluminum compound the mean molecular weight of the polymer can be regulated while obtaining a desired molecular weight distribution.

4 Claims, No Drawings

PROCESS FOR THE MANUFACTURE OF POLYOLEFINS

This is a continuation of application Ser. No. 785,275, filed Apr. 6, 1977, now abandoned.

BACKGROUND OF THE INVENTION

1. Field Of The Invention

This invention relates to the preparation of homopolymers and copolymers of ethylene with α-olefins where the polymerization is carried out to produce polymers of lower mean molecular weight characterized by a broad molecular weight distribution. This invention is particularly directed to a process for preparing a polymer which can be employed in injection molding processes and can also be reprocessed by extrusion.

2. Discussion Of The Prior Art

Various low pressure processes are known for the polymerization of α-olefins or mixtures thereof. According to Ziegler, catalysts are employed which consist of compounds of the metals of the 4th to the 6th transitional group of the periodic system, preferably titanium compounds and organometallic compounds of the elements of 1st to 3rd main groups of the periodic system, especially aluminum alkyls or alkylaluminum halides. The monomer reaction usually takes place in suspension or in solution, it can however also be conducted in the gas phase.

The products resulting from the process described above are converted by injection molding, blow molding and extrusion into injection molded articles, hollow forms, tubes or films. Each reprocessing procedure and each application area demand products with different physical properties. The mean molecular weight and the molecular weight distribution are the determining factors. This is on account of the fact that a polymolecular product is always obtained on synthesizing macromolecular substances. They consist of macromolecules which are synthesized from the same basic units but differ in their degree of polymerization. The mean molecular weight of a macromolecular substance represents the mean value of the molecular weight for the polymolecular mixture on hand. In order to determine the mean molecular weight several methods are available. For example osmotic measurements, light dispersal measurements, viscosity measurements, and ultracentrifuge experiments can all be used to determine the mean molecular weight.

However, many properties of a macromolecular substance such as toughness, hardness, elasticity, solubility and reprocessing capability, by means of known methods, such as, for example extrusion, are not only determined by the mean molecular weight but depend on the spread of the molecular weights of the macromolecules present in the polymolecular mixture. Polymerizates with a narrow molecular weight distribution are characterized by a high impact strength which is a criterion for the brittleness and toughness of a material. Polymerizates with a wider molecular weight distribution are characterised by improved flow properties and increased stability towards cracking due to stress corrosion.

It is therefore necessary when describing a macromolecular substance not only to define the mean molecular weight but also the distribution of the molecular weight. In order to determine the molecular weight distribution of a macromolecular material, it must be divided up into individual fractions. The molecular weight and amount in each fraction must then be determined. As these methods are involved and time consuming, generally an approximate determination suffices. The flow properties of polymers can be used to estimate the spread of a molecular weight distribution. For example, the quotient of the melt-indexes of a material, measured at various stresses ($MFI_5$ or $MFI_{15}$ as in DIN ]Deutsche Industrie Norm] No.53735) can serve as a measure of the spread of the molecular weight distribution. The quotient of $MIF_{15}$ and $MFI_5$ is designated the S-value, which is approximately 5 to 20 for polyethylene. Small S-values means narrow, large S-values broad molecular weight distributions.

Polyolefins with a narrow molecular weight distribution e.g., S-values between 6 and 7, and a low molecular weight of approximately 20,000 to 40,000 are especially suitable for injection molding processes. On the other hand, products with a broader molecular weight distribution e.g., S-values between 13 to 17 and a relatively large molecular weight (approximately 80,000 to 200,000) can be readily reprocessed by extrusion.

A polymer with a suitable molecular weight for reprocessing can be obtained by varying the reaction conditions, especially the polymerization temperature by altering the ratio of the catalyst components or by addition of chain-transfer substances to the reaction mixture. Hydrogen is used with preference for the latter purpose. Corresponding processes are, for example, disclosed in DT-PS No. 1 420 390 and DT-AS No. 1,595 666. Products are obtained from the processes described in these publications which have a narrow molecular weight distribution i.e., S-values between 6 and 7 which are ideally suited for injection molding purposes. According to DT-OS No. 1 720 611, in order to attain an ethylene polymer with up to 10 wt.% higher α-olefins, with a broad molecular weight distribution, the polymerization is conducted in two stages, either in suspension or in the gas phase. The mean molecular weight is regulated by means of hydrogen. According to a favored procedure the composition of the monomer mixture varies in both steps.

In order to regulate the mean molecular weight not only hydrogen is empoyed but also—to a lesser extent—alcohols and/or oxygen. A procedure of this type is described in DT-PT No. 1 210 987 in which catalysts consisting of titanium tetrachloride and dialkylaluminum monochloride are employed. In this case one obtains polymerizates with S-values between 13 and 15.

In practice, the known processes for regulating the mean molecular weight and the molecular weight distribution do not fulfill all requirements. In particular, they do not provide any simple way in which to manufacture polymerizates suitable for the manufacture, by extrusion, of molded articles with a smooth surface and high toughness. The addition of hydrogen, during the polymerization of α-olefins, can regulate the mean molecular weight within broad limits, however, the products obtained possess a narrow molecular weight distribution with the resultant disadvantages outlined above. On the other hand, the addition of alcohols and/or oxygen makes possible the manufacture of polymerizates with a broad molecular weight distribution. With this regulating system, the mean molecular weight cannot be varied. Multi-step processes for the manufacture of polymerizates with certain mean molecular weights and certain molecular weight distributions are technically involved and can frequently only be conducted discontinuously. Thus, they are not always suitable for an economic manufacture of the polymerizate.

It is, therefore, an object of this invention to overcome the outlined disadvantes of the prior art and to present a process which allows, in particular, the manufacture of polymerizates of ethylene and copolymerizates of ethylene with α-olefins in which the mean molecular weight can be varied over a wide range, i.e., from approximately 50,000 to approximately 100,000. The S-values for the molecular weight distribution correspond to approximately 7 to approximately 10.

SUMMARY OF THE INVENTION

In accordance with the present invention there is provided an improved process for the polymerization of ethylene or a mixture of ethylene and an α-olefin having 3 to 15 carbon atoms wherein the monomer or mixture of monomers are contacted at 20° to 250° C. at 1 to 50 bar pressure in a solution suspension or in gas phase with a mixed catalyst consisting of a chlorine containing titanium-(III) compound and an organoaluminum compound in the presence of hydrogen, the improvement residing in employing as the organoaluminum compound a trialkylaluminum compound in an amount of 0.1 to 20 mol per mol of titanium (III) compound and including in the polymerization reaction mixture 0.001 to 0.1 volume percent oxygen, based upon the amount of ethylene.

In accordance with the present invention it has been discovered that by carrying out the polymerization of ethylene or the copolymerization of ethylene with a $C_3$-$C_{15}$ α-olefin monomer that regulation of the process can be conducted to provide the desired product in terms of mean average molecular weight which product has a broad molecular weight distribution.

The process can be conducted in solution, in suspension or in the gas phase at temperatures between 20° to 250° C. preferably 60° to 90° C. Saturated hydrocarbons are particularly useful as suspension agents.

In accordance with the invention, ethylene can be polymerized alone or together with α-olefins possessing 3 to 15 carbon atoms. It is expedient to employ the higher α-olefins in amounts up to 5 wt.% relative to ethylene. Especially suitable are propene, butene, hexene.

Titanium trichloride, in particular, can be employed as the chlorine containing titanium (III) compound. However, other trivalent titanium compounds containing chlorine such as titanium alkoxychlorides can also be employed. The titanium (III) compounds are manufactured by reducing titanium (IV) compounds with organoaluminum compounds such as alkylaluminum sesquichloride, dialkylaluminum monochloride, alkylaluminum dichloride, trialkylaluminum or isoprenylaluminum. The reduction is conducted in an inert dispersion agent at temperatures between −60° and 120° C., preferably between −10° and 30° C. Thereafter the product is washed with the dispersion agent.

An essential characteristic of the process in accordance with the invention is the application of a trialkylaluminum as the aluminum component of the catalyst. The alkyl radicals can be the same or different and possess between 1 and 40 carbon atoms. Examples of such compounds are triethylaluminum, tripropylaluminum, triisobutylaluminum, trioctylaluminum or tridodecylaluminum. The products from the reaction between a trialkylaluminum or an alkylaluminum hydride and diolefin with 4 to 20 carbon atoms such as isoprene, e.g., isoprenylaluminum are suitable.

In accordance with the process of the invention 0.1 to 20 mol, preferably 0.5 to 3 mol of the trialkylaluminum compound are introduced per mol titanium-(III)-compound. The catalyst can be employed in such small amounts, that its removal from the polymerisate by special purification techniques is not necessary.

In order to regulate the molecular weight during the polymerisation, hydrogen is best introduced in such an amount that the hydrogen content of the gas phase—depending on the desired molecular weight range—lies between 1 and 80 vol.%. Lower hydrogen concentrations, within these limits, lead to the formation of polymerisates with a higher molecular weight and higher hydrogen concentrations lead to the formation of polymerisates with a lower molecular weight.

Oxygen is usually introduced into the reactor together with ethylene and hydrogen. However, it is also possible to introduce the oxygen separately to the reaction mixture. An amount of oxygen is chosen so that its share, relative to ethylene, amounts to 0.001 to 0.1 vol.%, preferably 0.005 to 0.03 vol.%.

The level of the oxygen concentration influences the level of the S-value of the polymerisate manufactured according to the process of the invention. Oxygen concentrations which lie at the upper limit of the claimed range, lead to S-values of approx. 10. On the other hand, lower oxygen concentrations result in smaller S-values which can be depressed to approx. 7.

Polymerisates are obtained from the claimed process which are especially suitable for processing by extrusion. Moulded articles from polymerisates manufactured according to the new process exhibit a high degree of toughness and perfect surfaces.

In order to more fully illustrate the nature of the invention and the manner of practicing the same the following examples are presented.

In the examples below, experiments 1 and 2 are comparative examples, whereas experiments 3 to 8 describe the process according to the invention. The values given in the table are explained below:

$MFI_{190/5}$; $MFI_{190/15}$(g/10 min)

The melt-index corresponds to DIN No. 53 735 and ASTM D No. 1238-65T at a temperature of 190° C. and a weight load of 5 kg or 15 kg.

S-Value

Quotient of the melt-indexes $\dfrac{MFI_{190/15}}{MFI_{190/5}}$

RSV-Value (100 ml/g)

Reduced specific viscosity, it is identical with the viscosity number corresponding to ISO/R1191 and the relative alteration in viscosity, with regard to concentration, corresponding to DIN No. 53 728.

Melt-fracture

The appearance of a rough or irregular surface of an extruded material (e.g., internal tube surface) at a critical shear rate.

On extruding polyethylene samples of comparable molecular weight at a constant shear rate, there is a relationship between the appearance of the melt-fracture and the spread of the molecular weight distribution. (c.f. KunststoffHandbuch Vol. I, C. Hanser Verlag, München; 4.3.7, Dr. G. Dörting, Rheology of Plastics).

EXAMPLES

Manufacture of the TiCl$_3$ component 460 m mol TiCl$_4$ were added dropwise to 556 m mol diethylaluminum chloride in a 2 liter three necked flask in the presence of a hydrocarbon fraction (bp. 140° to 170° C.). TiCl$_3$ was deposited as a fine brown precipitate.

Manufacture of the mixed catalyst

In the first example, the resulting suspension served, after dilution to the desired concentration, directly as catalyst.

In the examples 2 to 6, the brown precipitate was separated from the suspending medium and the dissolved reaction products were separated, reacted with triethylaluminum in the desired ratio and brought to the desired catalyst concentration using the hydrocarbon fraction.

EXPERIMENT 1 (COMPARISON)

800 liter ethylene, 4.4 g butene-1, 1 liter catalyst suspension containing 3.65 m mol TiCl$_3$ component, 5.5 m mol diethylaluminum chloride and 200 ml air were introduced continuously per hour, at 80° C. and 3 to 4 bar, into a 40 liter double wall pressure reactor, which was filled with a hydrocarbon mixture (b.p. 140° to 170° C.), and allowed to react.

The resulting polyethylene powder had the following properties:

| MFI*$_{190/5}$ g/10 | $S = \dfrac{MFI_{190/15}}{MFI_{190/5}}$ | RSV** dl/g | Melt fracture 32 ND10 tube | Impact strength according to DIN 53 453 Standard Test Bar. (double V-notch) |
|---|---|---|---|---|
| 0.29 | 13 | 3.5 | none | 4.5 |

\* = determined according to DIN 53 735
\*\* = determined according to ISO/R 1191

EXPERIMENT 2 (COMPARISON)

800 liter ethylene, 4.4 g butene-1, 1 liter catalyst suspension with 4 m mol TiCl$_3$ component and 20 m mol triethylaluminum and 8 liters hydrogen were introduced continuously per hour into the 40 liter double wall pressure reactor (as in Example 1) at 78° to 86° C. and 3 and 4 bar and allowed to react.

The resulting polyethylene powder had the following properties:

| MFI$_{190/5}$ g/10 | $S = \dfrac{MFI_{190/15}}{MFI_{190/5}}$ | RSV dl/g | Melt fracture 32 ND10 tube | Impact strength according to DIN 53 453 Standard Test Bar. (double V-notch) |
|---|---|---|---|---|
| 0.35 | 6.6 | 3.9 | melt fracture | 11.3 |

EXPERIMENT 3

800 liter ethylene, 4.4 g butene-(1), 1 liter catalyst suspension with 4 m mol TiCl$_3$ component, 2.8 m mol triethylaluminum, 250 ml air and 8 liter hydrogen were introduced continuously per hour, at 78° to 80° C. and 3 to 4 bar, into the pressure reactor, used in Example 1, and allowed to react.

The resulting polyethylene powder had the following properties:

| MFI$_{190/5}$ g/10g | $S = \dfrac{MFI_{190/15}}{MFI_{190/5}}$ | RSV dl/g | Melt fracture 32 ND10 tube | Impact strength according to DIN 53 453 Standard Test Bar. (double V-notch) |
|---|---|---|---|---|
| 0.30 | 8.7 | 4.7 | none | 6.3 |

EXPERIMENT 4

This was conducted using the pressure reactor as in Example 1, and the same condition as in Example 3, except that 4.4 g butene were replaced by 20 g hexene-1 and allowed to react.

The resulting polyethylene powder exhibited the following properties:

| MFI$_{190/5}$ g/10g | $S = \dfrac{MFI_{190/15}}{MFI_{190/5}}$ | RSV dl/g | Melt fracture 32 ND10 tube | Impact strength according to DIN 53 453 Standard Test Bar. (double V-notch) |
|---|---|---|---|---|
| 0.32 | 8.9 | 4.6 | none | 6.9 |

EXPERIMENT 5

In this case 40 g hexene-1 were introduced instead of 20 g hexene-1 in contrast to Example 4, the conditions and the pressure reactor (c.f. Experiment 1) were otherwise the same.

The resulting polyethylene powder exhibited the following properties:

| MFI$_{190/5}$ g/10 | $S = \dfrac{MFI_{190/15}}{MFI_{190/5}}$ | RSV dl/g | Melt fracture 32 ND10 tube | Impact strength according to DIN 53 453 Standard Test Bar. (double V-notch) |
|---|---|---|---|---|
| 0.31 | 8.7 | 4.6 | none | 7.0 |

EXPERIMENT 6

In contrast to Examples 3-5 no comonomers were added to the pressure reactor used in Example 1. The remaining conditions were unchanged.

The resulting polyethylene powder exhibited the following preperties:

| $\frac{MFI_{190/5}}{8/10 \text{ min.}}$ | $S = \frac{MFI_{190/15}}{MFI_{190/5}}$ | RSV dl/g | Melt fracture 32 ND10 tube | Impact strength according to DIN 53 453 Standard Test Bar. (double V-notch) |
| --- | --- | --- | --- | --- |
| 1.6 | 8.5 | 3.8 | none | 6.6 |

EXPERIMENT 7

In contrast to Example 4, instead of 250 ml air, 150 ml air were introduced per hour into the pressure reactor used in Example 1. The remaining conditions were unchanged.

The resulting polyethylene powder exhibited the following properties:

| $\frac{MFI_{190/5}}{g/10}$ | $S = \frac{MFI_{190/15}}{MFI_{190/5}}$ | RSV dl/g | Melt fracture 32 ND10 tube | Impact strength according to DIN 53 453 Standard Test Bar. (double V-notch) |
| --- | --- | --- | --- | --- |
| 0.29 | 7.5 | 4.3 | none | 9.5 |

EXPERIMENT 8

In contrast to Experiment 7, instead of 150 ml air, 50 ml air were introduced per hour into the pressure reactor used in Example 1.

The resulting polyethylene powder exhibited the following properties:

| $\frac{MFI_{190/5}}{g/10}$ | $S = \frac{MFI_{190/15}}{MFI_{190/5}}$ | RSV dl/g | Melt fracture 32 ND10 tube | Impact strength according to DIN 53453 Standard Test Bar. (double V-notch) |
| --- | --- | --- | --- | --- |
| 0.34 | 7.0 | 4.1 | none | 10.2 |

What is claimed is:

1. In a process for the polymerization of ethylene or a mixture of ethylene with an α-olefin with a $C_3$–$C_{15}$ α-olefin in solution, suspension or in the gas phase by contacting the ethylene or ethylene-α-olefin mixture at 20°–250° C. at 1 to 50 bar pressure with a mixed catalyst comprising a titanium (III) trichloride and an organoaluminum compound in the presence of hydrogen, the improvement which comprises employing as the organoaluminum compound 0.1 to 20 mols of triethylaluminum, triisobutylaluminum or isoprenylaluminum per mol titanium (III) trichloride and including in the reaction mixture oxygen at a concentration of 0.001 to 0.1 volume percent, based upon the volume of ethylene.

2. A process according to claim 1 wherein ethylene is copolymerized with propene, butene-1 or hexene-1.

3. A process according to claim 1 wherein the oxygen is present in the polymerization reaction mixture at a concentration of 0.005 to 0.03 volume percent, based upon the volume of ethylene.

4. A process according to claim 1 wherein the hydrogen is present in the reaction mixture in a concentration of 1 to 80 percent by volume, based upon the volume of the gas phase.

* * * * *